United States Patent [19]

Anderson

[11] Patent Number: 4,503,995

[45] Date of Patent: Mar. 12, 1985

[54] QUANTITY-METERING DEPOSITOR FOR FLOWABLE FOOD PRODUCTS

[75] Inventor: Joseph R. Anderson, Ada, Mich.

[73] Assignee: Werner Lehara, Inc., Grand Rapids, Mich.

[21] Appl. No.: 362,906

[22] Filed: Mar. 29, 1982

[51] Int. Cl.³ .......................... G01F 11/02; A21C 5/04
[52] U.S. Cl. .................................... 222/219; 222/221; 222/292; 222/307; 425/241
[58] Field of Search ............... 222/218, 219, 221, 292, 222/307; 425/240, 241, 238, 239

[56] References Cited

U.S. PATENT DOCUMENTS

| 788,124 | 4/1905 | Van Houten | 425/241 X |
| 2,754,774 | 7/1956 | Vogt | 425/241 |
| 2,787,972 | 4/1957 | Vogt | 222/219 X |

FOREIGN PATENT DOCUMENTS

| 131645 | 8/1932 | Austria | 425/241 |
| 856029 | 12/1960 | United Kingdom | 222/219 |

Primary Examiner—Joseph J. Rolla
Assistant Examiner—Frederick R. Handren
Attorney, Agent, or Firm—Price, Heneveld, Huizenga & Cooper

[57] ABSTRACT

A positive-displacement volumetric metering depositor particularly but not exclusively useful in food production equipment has a continuously-rotating cylinder with a diametrically-disposed metering piston or plunger having the general form of an elongated, relatively narrow rectangular geometric solid of a desired height which moves cyclically across the diametral cylinder passage during its rotation to receive a measured volume of media at the top of cylinder rotation and discharge such volume at the bottom of cylinder rotation. Cams and cam followers control such cyclic piston movement, and are adjustable to vary the volume of the measured charge by changing the relative positions of a pair of complementary component piston parts together defining the composite metering piston. The ejected volumetric charges of media enter a common discharge area and are forced downwardly through a series of mutually distinct shaping die orifices, at which incrementally-advancing media may be sheared transversely to the die orifice to form a succession of identical discrete quantities.

9 Claims, 29 Drawing Figures

QUANTITY-METERING DEPOSITOR FOR FLOWABLE FOOD PRODUCTS

BACKGROUND OF THE INVENTION

This invention relates to continuously-repetitive volumetric metering apparatus which is especially useful with media such as food product mixtures, e.g., baking doughs and the like, confections, etc.; in a larger sense, however, the metering apparatus lends itself desirably to use with a great many different media, not necessarily limited to the area of food products.

In a more particular sense, and in a more particular application, the invention relates to a highly accurate food product depositor for repeatedly depositing substantially identically sized quantities of food products, such as for example cookie dough, upon a desired carrier such as a bake oven band-type conveyor. In an even more particular sense, the invention relates to what could be termed a highly accurate positive-displacement metering-type apparatus, and to a new concept for a "wire-cut machine", which in the baking trade is a well-known apparatus which operates, generally speaking, by forcing a continuous supply of baking dough downward through shaping orifices, and passing a cutting wire or knife beneath each such orifice at repeated time intervals, thereby slicing off a short cylindrical (or otherwise-shaped) segment of the baking dough, representing an individual cookie or the like.

Wire-cut machines, of the general nature just noted, have long been used in the baking trade, and also to some extent in related fields, and such machines do provide a reasonably consistent food product deposit. In the past, these and other such known types of machines have generally been accepted as being sufficiently accurate to provide the degree of repetitive uniformity regarded as necessary in large baking and other food product processing plants. However, just as in other industries, it is becoming increasingly necessary to provide very accurate, and accurately-repeatable, metered dispensing means, by which each individual deposit is substantially identical with preceding and succeeding deposits, particularly with respect to weight, in order to optimize economic considerations.

As a consequence, there has for some time now been a need for increasingly accurate and highly repeatable depositors, particularly for food products but also for other media as well. While this need has, it is believed, led to consideration of both old and of relatively new machinery concepts, representing at least to some extent departures from known or previously-used concepts, there is believed to be a certain rather definite preferance for retaining types of machinery which are at least generally known and proven. Thus, modified and allegedly improved forms of rotary molding machines have been proposed from time to time, as shown for example in U.S. Pat. No. 2,815,573 to Trelease, which deals with the manufacture of cheese slices, although that apparatus may be considered relatively similar in many ways to the earlier apparatus shown in U.S. Pat. No. 2,340,501 to Aasted, dealing with candy manufacture. Other examples of such variations may be seen in U.S. Pat. No. 3,648,624 to Verhoeven, assigned to the assignee of the present invention, and U.S. Pat. No. 2,728,308, showing a rotary machine identified as a "Dough Pump". Still further examples may be seen in the patents to Fay, U.S. Pat. Nos. 3,205,837, 3,427,649, and 4,212,609, dealing with a multiple-cavity rotary molding machine disposed beneath a pair of counter-rotating feed rolls fed from a supply hopper. In the latter apparatus, each such molding cavity has an ejecting piston operating from within the rotary cylinder, by which the material in the molding cavity is ejected at a given point in the rotation of the cylinder.

BRIEF SUMMARY OF THE PRESENT INVENTION

Generally speaking, the present invention provides a new concept for the structure and operation of a wire cutlike machine, resulting in a new machine concept affording highly consistent and continuously-repetitive volumetric metering, particularly of value in food processing applications, but also of potential value in numerous other instances where flowable media is to be deposited in discrete amounts desired to be highly consistent, to the point of substantially identical weights, volumes, sizes and shapes.

In a different sense, the present invention provides a new concept for volumetric metering apparatus, comprising a rotary member, which may take the form of a cylinder, and one or more positive-displacement volume-metering pistons, and in particular a shuttle-like piston having a long and relatively narrow rectangular cross section. Such pistons meter out a shaped charge each half-cycle of cylinder member rotation, and the shuttle piston, when selected for use, has a three-dimensional rectangular shape and operates such that when moved downward to eject a charge, at the bottom, the top side of the piston lowers to receive a new charge, of identical size and shape as the charge then being simultaneously discharged at the opposite end of the piston.

Combined with the concept just noted, the invention provides for the conjoint use, and cooperative operation, of a series of adjacent and commonly-fed, but mutually-distinct, discharge orifices, disposed beneath the metering piston to receive the entire metered discharge of media, and to form therefrom a particular series of adjacent separate columnar extrusions, which may either be identical to one another or mutually different in shape and cross-sectional area.

Coupled with the aforementioned compound or combined positive-displacement piston-metering and multiple-orifice discharge die arrangement is, preferably, a wire-cut head which provides an oscillating or cycling wire or other knife immediately below the discharge orifices, such knife moving back and forth to cut off discrete layers from the material being extruded through the discharge orifice each time the knife moves past the end of the orifice.

Further concepts and structural features of the present invention will become more apparent following consideration of the ensuing detailed specification, in light of the appended drawings, which together set forth certain preferred embodiments as illustrations of the invention.

DESCRIPTION OF THE PREFERRED EMBODIMENTS

Figure 1:
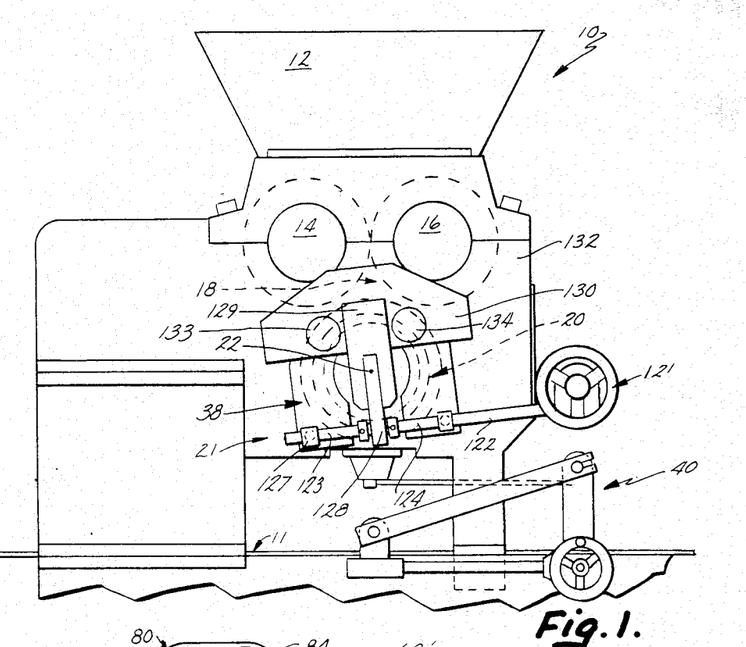
FIG. 1 is a fragmentary side elevation of the overall apparatus, showing its general structural characteristics.

Referring first to FIG. 1, the positive-displacement, volumetric metering depositor apparatus 10 of the invention may be seen to comprise, generally, a deposit head assembly which is posed above a typical bake oven band 11 or other such conveyor, upon which substantially identical deposits are to be placed. In a very general way, the apparatus 10 may be said to comprise a supply means 12, in the preferred embodiment comprising a hopper having an opening at the top to continuously receive incoming media and, at a lower position, a pair of counter-rotating feed rolls 14 and 16. The feed rolls rotate toward one another and define therebetween a desired nip, through which is forced a continuing stream or sheet of the media to be deposited, which is fed, usually at a desired pressure, into an area 18 below the feed rolls, which may be termed the supply discharge area.

Directly beneath the discharge area 18 of the supply means 12, the metering depositor apparatus 10 includes a rotating depositor apparatus 20, referred to herein as a "cylinder" although not necessarily being such in a true geometric sense, and beneath that is an adjustment apparatus 21 for changing the volumetric quantities which are continuously deposited. Beneath the latter is a series of adjacent discharge-shaping orifices 34, to be described subsequently, together with a reciprocatory knife mechanism of the general type known as a "wire-cut" mechanism 40. This latter component is a known type of mechanism in the food-handling field, particularly in the baking art, which has long been used in conjunction with extruder die cups through which dough or the like is forced in a steady column, and serves to oscillate back and forth beneath the extrusion orifice so as to cut off extruded segments and thereby form wafers. Merely as examples of the general type of device, reference is made to prior U.S. Pat. Nos. 2,162,145 to F. C. Werner and 3,448,696 to A. F. Verhoeven, both assigned to the assignee hereof. Due to the general familiarity in the art with such oscillating "wire-cut" devices, no particular detailed explanation is deemed necessary herein, even though the presence of such a component within or as part of the overall apparatus disclosed herein is, at least in a functional or operational sense, of definite importance.

Figures 2, 6, 7:
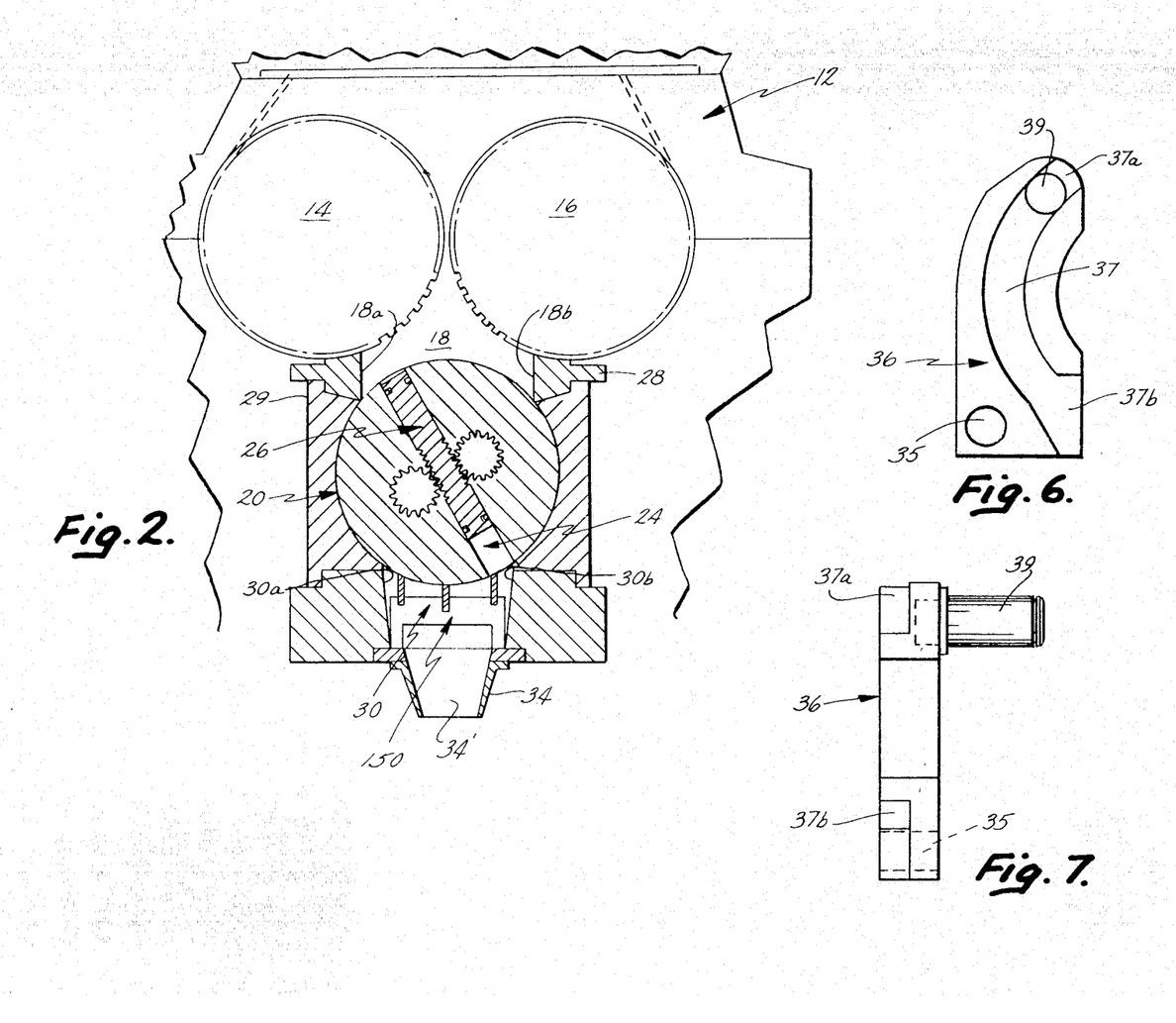
FIG. 2 is an enlarged, fragmentary cross-sectional elevation of one form of the apparatus, showing certain internal structural features.
FIG. 6 is a rear elevational view of one of the cams, as seen from the sectional plane VI—VI of FIG. 4.
FIG. 7 is a side elevational view of the cam shown in FIG. 6.

The primary operative components of the overall metering apparatus 10 comprise the aforementioned "cylinder" 20, which in a general sense may be of practically any desired cross-sectional shape but preferably generally symmetrical about its longitudinal axis of rotation 22, and one or more pistons or positive-displacement metering plungers, 26, which components are illustrated in somewhat simplified or pictorial form in FIG. 2. As illustrated in that embodiment, the metering plunger means 26 may be a single member of generally rectangular cross section, and while this is a useful embodiment under certain conditions, a more preferred form is that illustrated in FIGS. 3, 14 and 15, in which the piston or plunger means is in effect subdivided to form two mutually cooperative components 26a and 26b, which interfit together and operate like a unitary piston or plunger, but which are adjustable relative to one another, as described more fully hereinafter. With further reference to FIG. 2, it will be seen that the feed roll discharge outlet area 18 is formed as a laterally-elongated trough of V-shaped configuration, having (in the example shown) inclined sides 18a and 18b. Similarly, below the rotatable cylinder-defining means 20 is an angularly convergent outlet or discharge area 30 formed by converging walls 30a and 30b which in effect funnel toward one another to feed into the top of the aforementioned discharge-shaping orifice array 34. In a preferred embodiment, the latter may comprise an aligned, adjacent series of separate, or functionally distinct, discharge die cups 34', 34'', etc., which may be either separate or ganged together in structure.

Figure 16:
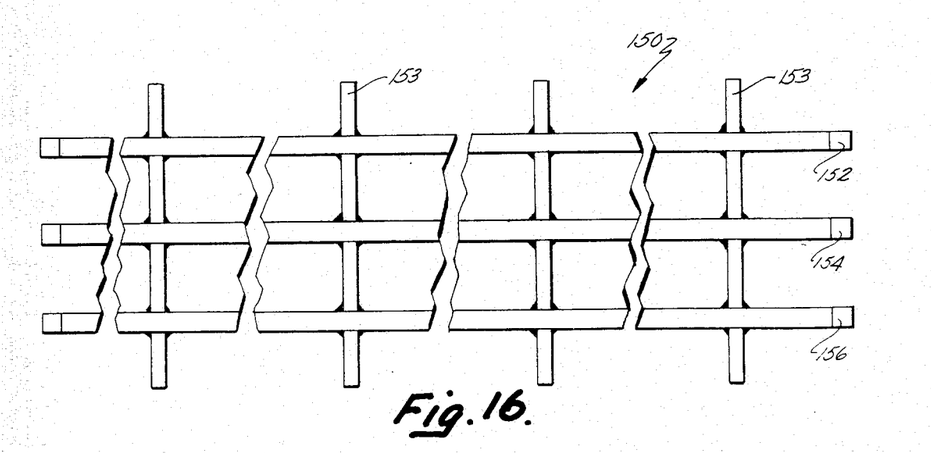
FIG. 16 is an overhead plan view of a preferred scraper-bar or doctor knife apparatus for the bottom of the rotary cylinder.

It will be noted that, as also shown in FIG. 2, the discharge area 30 beneath the cylinder 20 also preferably includes an array of scraper bars or doctor knives, designated generally 150, comprising a series of mutually-spaced scraper elements 152, 154 and 156. A preferred structural form for such apparatus is further illustrated in FIG. 16, from which it may be seen that the three elongated scraper elements are interconnected by crosspieces 153 to form a rigid, self-reinforcing lattice or ladder construction, which may be of welded metal strips for example. The purpose and effect of the scraper apparatus 150 will be commented upon more particularly hereinafter.

Figure 14:
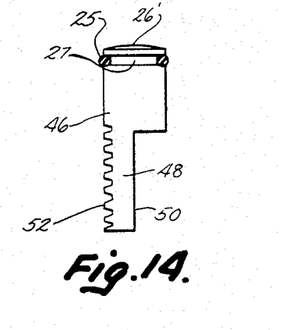
FIG. 14 is an end elevational view of one of the positive-displacement piston halves.
Figure 15:
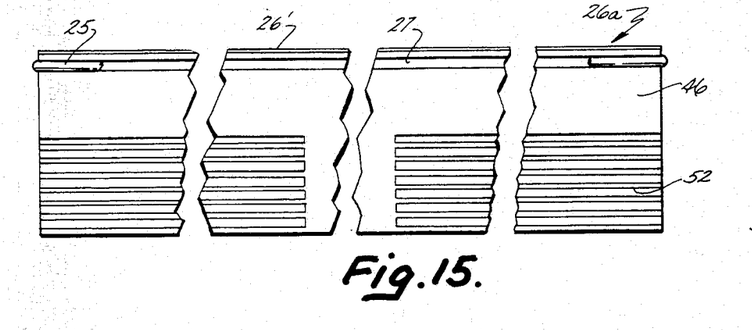
FIG. 15 is a side elevational view of the piston half seen in FIG. 14.

As indicated above, one preferred embodiment for the positive-displacement metering plunger, or piston, means 26 comprises a complementary-disposed pair of component piston "halves" 26a and 26b, exemplary of which is the piston component 26a shown in FIGS. 14 and 15. As seen there, each such piston component, or half, has an upper portion 46 defining an elongated member of generally rectangular cross section, from which depends a similarly elongated flange or skirt portion 48 which interfits with the like portion of the other piston half, along a flat surface 50 contiguous to and slidable upon the like surface of the other such piston half. Opposite sliding surface 50 is an elongated series of adjacent lands and grooves defining the teeth of a rack gear 52 extending substantially the entire length of the piston half, which may if desired be a discontinuous series of teeth to be engaged by separate spaced gears or, if desired, a continuous rack gear to be engaged by a continuously-splined shaft. At the top of each piston half or component 26a, 26b is a longitudinally-extending domed ridge, whose center of curvature matches that of the "top" and "bottom" of the rotatable cylinder 20, i.e., those portions of the cylinder through which open the opposite ends of the diametrical passage 24 extending through the cylinder, in which the positive-displacement metering piston 26 unit is located (see FIGS. 2, 3 and 4).

Figure 4:
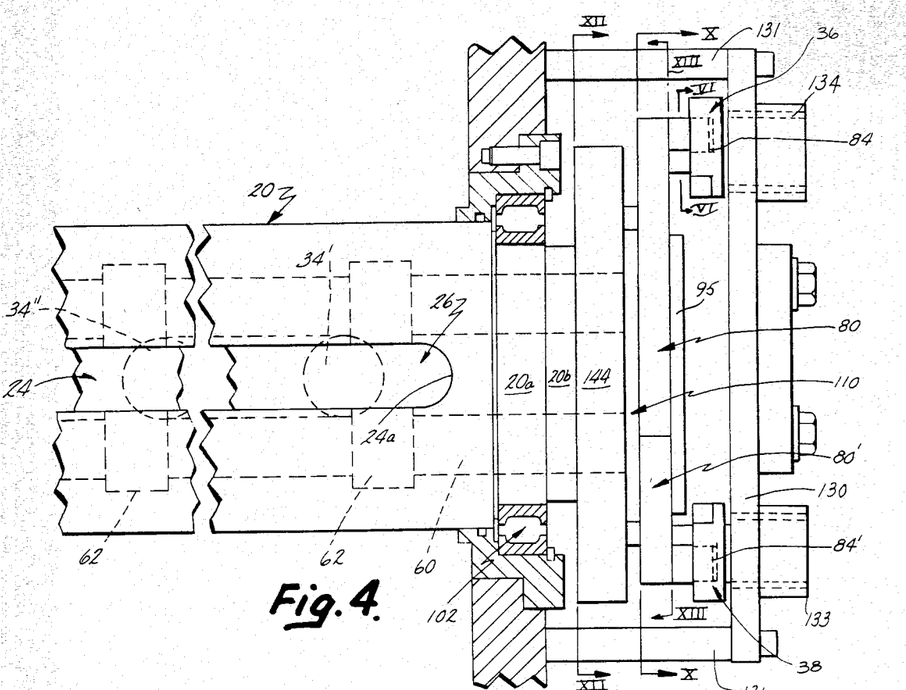
FIG. 4 is a fragmentary overhead plan view showing the apparatus of FIGS. 1 and 3 presented, in the enlarged scale of FIG. 3.

As best illustrated in FIG. 4, the piston passage 24 is a laterally-elongated slot having generally parallel sides, and each end is preferably rounded in shape, with the ends of the piston being similarly rounded. This rounded shape is used to facilitate manufacturing machining, and also to enhance and facilitate sealing of the piston with respect to the passage. That is, each piston component 26a and 26b also has a seal 25, which may comprise an O-ring, disposed in an appropriate recess 27 extending completely around the top of each piston component, just below the domed ridge 26' thereof. These seals effect a sliding seal of the piston against the walls of piston passage 24. Such seals are also preferably used in single-piston or one-piece piston implementations such as is shown in FIG. 2.

Figure 3:
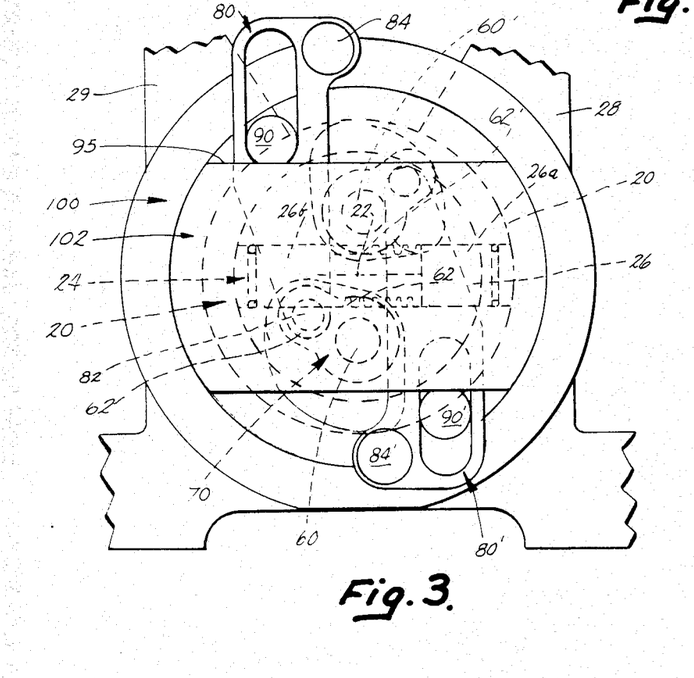
FIG. 3 is an enlarged, somewhat simplified, fragmentary end elevational view of the apparatus, showing the rotary cylinder and certain operative components of the positive-displacement pistons.
Figure 17:
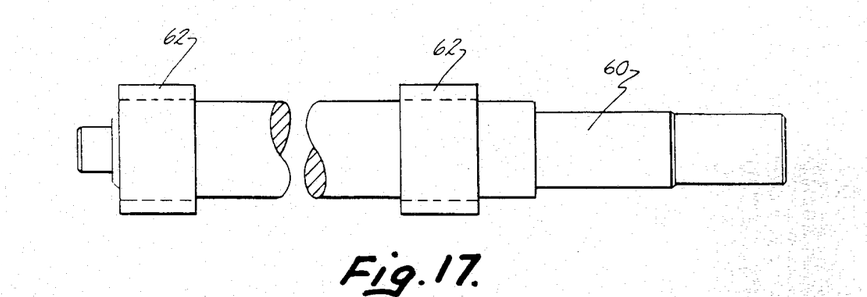
FIG. 17 is a side elevational view of the pinion gears and their shaft which actuate each of the positive displacement piston halves.

The above-noted two-part preferred embodiment of the positive-displacement piston or plunger means 26 is illustrated in FIG. 3 for example, and has the two piston components disposed back-to-back and juxtaposed together in complementary relation within the passage 24. Extending longitudinally through the cylinder 20 adjacent each side of the piston passage 24 is an elongated bore which receives a pinion gear shaft 60, 60', illustrated in more detail in FIG. 17. As seen in the latter Figure, the pinion gear shaft 60 carries a pair of mutually-spaced pinion gears 62, and these gears mesh with the rack teeth 52 on the piston halves 26a, 26b, as noted previously, i.e., each of the pinion gears 62 carried on the shaft 60 mates with the same rack teeth on one of the piston halves, but at spaced intervals from one another; thus, the mutually-spaced pinion gears 62 essentially comprise spaced segments of an elongated spline shaft.

Each of the pinion shafts 60 is pinned at its end extremities to an actuating crank throw 70 comprising in effect a generally oval-shaped member having an enlarged, rounded lower extremity 72 with a central opening 74 which receives and is pinned to the end of the pinion gear shaft 60, and also having a somewhat smaller but also rounded upper extremity 76 with a central opening 78 which rotatably receives a pin end portion 82 of one of the two piston-drive slide bars 80.

With this structure, the crank throws 70 are rotated by the generally longitudinal reciprocatory movement of the piston-drive slide bars 80, as described subsequently.

Figure 10:
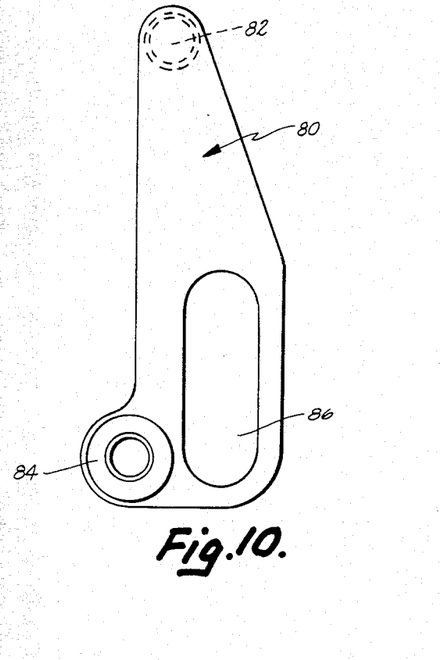
FIG. 10 is a front elevational view of one of the cam follower and slide bar linkages, as seen from the sectional plane X—X of FIG. 4.
Figure 11:
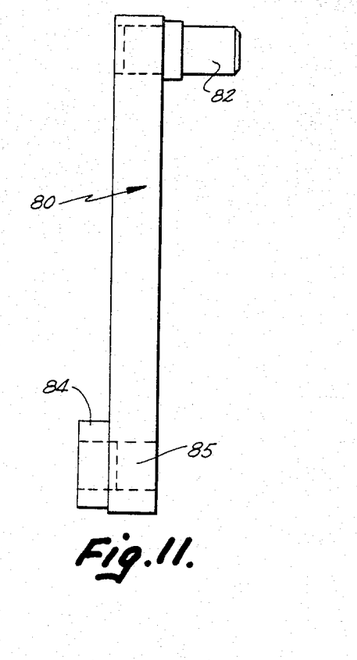
FIG. 11 is a side elevational view of the apparatus shown in FIG. 10.
Figure 12:
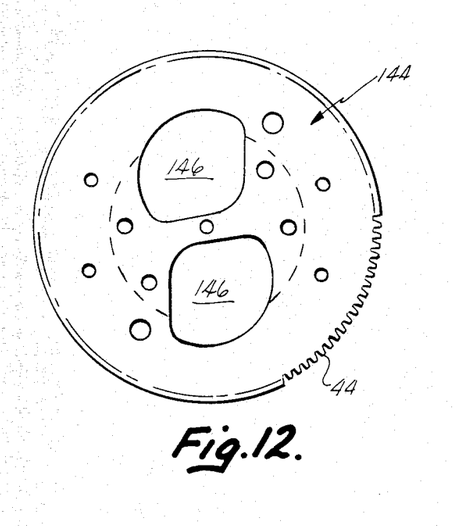
FIG. 12 is an end elevational view of one of the cylinder drive gear plates, as seen from the sectional plane XII—XII of FIG. 4.

The piston-drive slide bars 80 are shown in more detail in FIGS. 10 and 11, in which the connecting pin 82 received in opening 78 of crank 70 is shown at the top. A rotatably mounted cam follower 84 projects laterally outward from the bottom portion of the slide bar 80, as depicted in these Figures. Cam follower 84 preferably comprises a bushing or bearing member secured to the projecting end of a pin 85 which is fitted (or threaded) into an appropriately-sized hole in the slide bar 80. In other respects, the slide bar 80 has an elongated slide opening 86 which receives a projecting guide 90, 90' (FIG. 3) preferably comprising a rotary cam follower bushing mounted upon a stud which is threaded into and which extends laterally outwardly from the side of a cylinder drive gear 144 (see FIGS. 4 and 12) referred to in more detail hereinafter.

Each of the cam followers 84, 84' of the two slide bars 80 project into a curved, slot-like cam track 37 comprising a recess or groove formed in the respective cams 36 and 38 (FIGS. 4 and 6), along which track the projecting cam followers move during each rotation of the cylinder 20. That is, the cam recess or groove 37 is open at each end 37a and 37b, and upon each full rotation of the cylinder 20, each of the cam followers 84, 84' will sequentially move into, traverse the length of, and move out of the curved cam tracks 37 of both cams 36 amd 38. Thus, under conditions wherein their cam tracks define a circular path concentric to the axis of rotation of cylinder 20, the slide bars 80 will not undergo longitudinal shifting movement as a result of traversing the length of the cam tracks; however, wherever the cam tracks are non-concentric to the center of rotation of cylinder 20, the slide bars will be translated longitudinally by camming action. As pointed out hereinafter, any such slide bar motion resulting from such camming action will cause a rotational movement of the crank throws 70, 70', with resulting rotation of the pinion gear shafts 60 and 60'. This in turn rotates the gear segments or sectors 62 fixed to pinion gear shaft 60, against the rack teeth 52 of the positive-displacement metering piston halves 26, thereby moving these plunger members along their passage 24.

Figure 5:
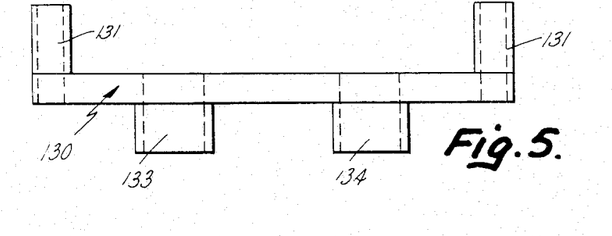
FIG. 5 is an overhead plan view of a portion of the apparatus seen in FIG. 1.
Figure 8:
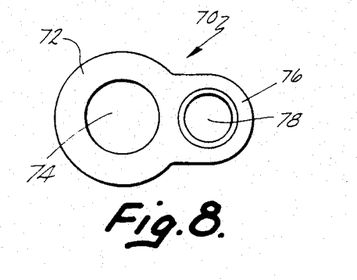
FIG. 8 is a front elevational view of one of the cycling cranks utilized in the apparatus.
Figure 9:
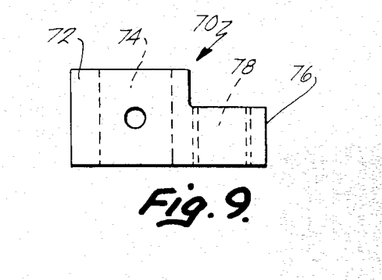
FIG. 9 is a side elevational view of the crank shown in FIG. 8.

As indicated above, the structure of a preferred form of the cams 36, 38 may be seen in FIGS. 6 and 7, from which it will be noted that each is a generally flat, plate-like member having arcuate sides, with one of the respective cam grooves or tracks 37 milled or otherwise formed in one of the flat faces, in the form of a three-sided channel which is open on one side. Near the top portion, each cam has an outwardly-projecting mounting pin 39, by which it is rotatably mounted upon a fixed support, e.g., the outer support plate 130 shown in FIGS. 1 and 5, which has a pair of bosses 133, 134, preferably with press-fitted bushing therein (not specifically shown) for receiving the cam mounting pivot pins 39.

Near the bottom, each of the cams 36, 38 has an aperture 35, by which it may be pivoted upon its mounting pin 39, to thereby change the relative degree of concentricity or non-concentricity of its cam track 37 with respect to the rotational axis 22 of the cylinder 20. Such pivotal movement of the cams is effected by the aforementioned adjustment apparatus 21 (FIG. 1) which, in essence, comprises a handwheel 121 linked by appropriate gearing (e.g., right-angle gearing, or bevel gears) to a rotary shaft 122 having on its lower-most extremity oppositely-threaded portions 123 and 124 (i.e., one left-hand threaded and one right-hand threaded portion). These counter-threaded portions comprise, in effect, oppositely-operating lead screws which engage, and are followed by, follower nuts 126 and 127, which in turn are secured to the aforementioned lower apertures 35 in the cams 36 and 38. The center portion of the adjustment shaft 122 is held in longitudinally-fixed position by a fixed guide plate 128 having an appropriate aperture therethrough, on either side of which the shaft 122 preferably carries a positioning collar of a conventional nature, e.g., having set screws for maintaining their position along the shaft and thus fixing the shaft with respect to the guide plate 128. The latter, in turn, is secured to a mounting plate 129, which is bolted or otherwise fixed to the outer support plate 130, and that is mounted in a fixed position, as by bolting through stand-offs 131 (FIG. 5) to the rigid, main machine housing 132 or other suitable fixed support.

In accordance with the foregoing description of the adjustment apparatus 21, it will be realized that rotation of the handwheel 121 and its shaft 122 will result in oppositely-directed pivotal movement of each of the cams 36 and 38 about its upper mounting pin 39, thereby changing the aforementioned extent of concentricity or non-concentricity of the cam tracks 37 with respect to the cylinder axis 22.

The overall assembly of the cylinder 20 and piston or plunger means 26, and of the various operational components associated therewith (as referred to hereinabove) may be seen in FIG. 4, which should be understood as showing one end of the assembled apparatus, the opposite end being substantially identical for purposes of this discussion. Referring now to FIG. 4, and also to FIGS. 5–13, inclusive, which illustrate certain of the component parts separately, it will be seen that the cylinder 20 is supported at its ends by an annular roller or ball-bearing assembly 102 which fits around the outside of a necked-down portion 20a of the cylinder 20 and which is in turn supported within the outer fixed support 100 (which may be understood to include the vertical supports 28 and 29 referred to hereinabove). Immediately outward of the reduced-diameter cylinder portion 20a is a further projection 20b of the cylinder, to the outboard planar face of which is rigidly secured the cylinder drive gear 144 shown in FIG. 12, which should be understood as having drive teeth 44 completely around its outer periphery. It will be noted that the cylinder drive gear 144 has a pair of oppositely-disposed arcuate recesses 146 extending therethrough, and it is within these recesses that the two crank throws 70 are disposed, with the pivotal portion 72 of the crank throws positioned at the apex of the recesses 146. The cylinder 20, described hereinabove as being continuously rotatable, is rotatably driven by the drive gear 144, whose drive teeth 44 should be understood as being engaged by an appropriate driving gear which is coupled to a motor or driven shaft for output power, the cylinder drive rotation being synchronized to the cutting stroke of the reciprocating cutter 40.

Figure 13:
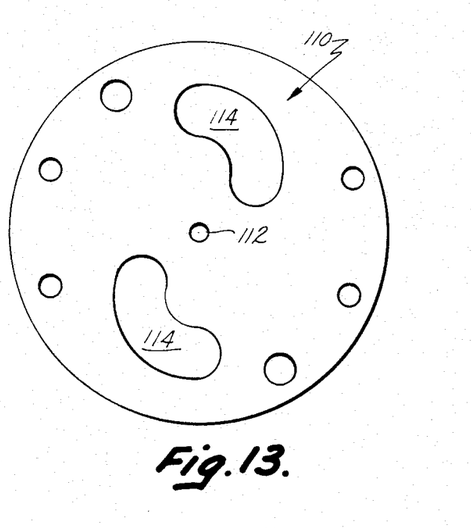
FIG. 13 is an end elevation of one of the slide plates, as seen from the section of plane XIII—XIII of FIG. 4.

With continued reference to FIG. 4, immediately outboard of the cylinder drive gear 144 is disposed the inner slide plate 110 shown in FIG. 13, which is also rigidly secured to the cylinder 20, and which defines a pair of arcuate slots 114. Immediately outboard of the slide plate 110, and in slidable contact with the face thereof, are the two piston drive slide bars 80, and the projecting pin ends 82 thereof extend through the arcuate slots 114 in the slide plate 110 to engage the actuating (i.e., pivot-inducing) aperture 78 in the crank throws 70. Disposed immediately outward of, and in sliding contact with, the slide bars 80, 80' is an outer slide plate 95, which is also visible in FIG. 3.

The foregoing detailed description of particular preferred embodiments should not be considered excluding other structures and arrangements of components which also embody the underlying principles and concepts, since it should be understood that multiple component pistons could also be used, and the piston passages need not extend diametrically of or completely through the "cylinder" or other such rotary member. Additionally, other specific types and forms of piston position-adjusting and piston actuating means could well be used, as could other forms of cut-off apparatus. Further, various other means could certainly be utilized for supplying the dough or other media to the volumetric chamber, the counter-rotating feed rolls shown primarily constituting an advantageous implementation having the added virtue of familiarity to those skilled in the art.

The overall operation of the particular preferred embodiments referred to in detail above is described hereinafter with particular reference to FIGS. 18, 19, 20 and 21, which are to be understood as somewhat simplified or schematic in format, for the purpose of illustrating the general cooperative operation of various component parts whose structure is illustrated more specifically in other Figures and described in more detail above.

Figure 18A:
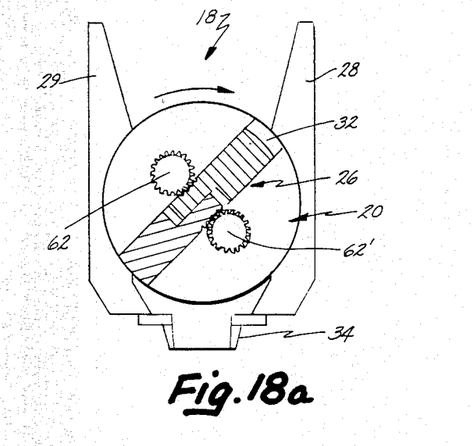
FIGS. 18a, 19a, 20a and 21a schematically show the relative positions of the cylinder and two-part piston in successive stages of movement.

Referring first to FIG. 18, the cylinder 20 is illustrated in a first position of rotation, within and between its vertical supports 28 and 29, in which the two-part, compound positive-injection piston or plunger means 26 is disposed approximately halfway between being vertical and horizontal, at which point the leading upper edge of the plunger 26 has moved approximately halfway behind, or into registry with, the semi-cylindrical recess in vertical support 28 which is complementary to the outer circumference of cylinder 20. At this point of relative rotation, the volumetric cavity 32 which defines the measured charge of media to be metered from the apparatus has passed essentially through the discharge outlet 18 of the supply means hopper 12, and will thus be filled with the media. The lowermost extremity of the positive-displacement plunger 26 is, at this point of plunger rotation, just moving into congruent contiguity with the cylindrical recess in vertical support 29.

Figure 18B:
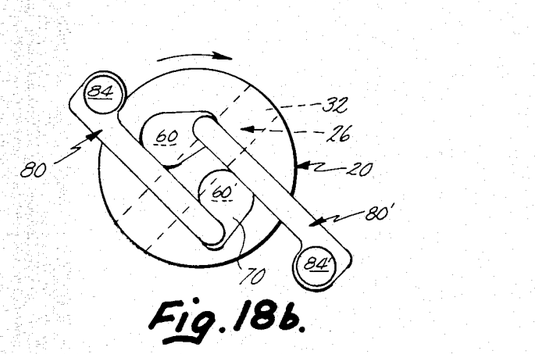
FIGS. 18b, 19b, 20b, and 21b schematically show the positions of the slide bars and crank throws with respect to the cylinder in successive stages of movement.
Figure 18C:
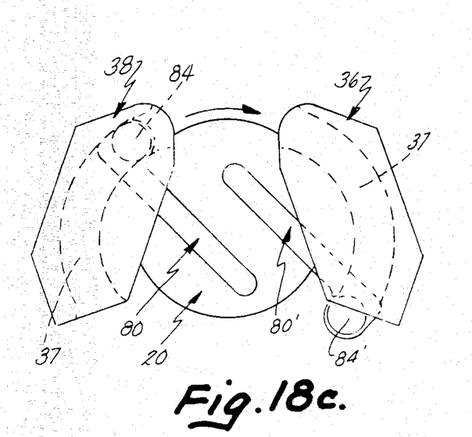
FIGS. 18c, 19c, 20c, and 21c schematically show relative positions of the slide bars and cams in successive stages of movement.

The relative positions of the slide bars 80, 80', the crank throws 70 and 70', and the cams 36 and 38, corresponding to the position of the positive-displacement plunger as seen in FIG. 18a is illustrated in FIGS. 18b and 18c, from which it will be noted that cam follower 84 of slide bar 80 is just about to emerge from (i.e., clear) the upper extremity of cam track 37 in cam 38; conversely, cam follower 84' of slide bar 80 is just emerging from (i.e., clearing) the lowermost extremity of cam track 37 in cam 36. Since, as shown in FIG. 18c, cams 36 and 38 are disposed (for purposes of illustration here) in a position of adjustment in which their lower extremity has been pivoted outward or away from one another to some extent, cam tracks 37 are perceptibly out of concentricity with the rotational axis 22 of cylinder 20. Therefore, the radial distance from axis 22 outward to the rotational center of lower cam follower 84' is greater than the radial distance from axis 22 upward to the center of cam follower 84, thus accounting for the downwardly-shifted position of the entire positive-displacement plunger 26, as noted above.

Figure 19A:
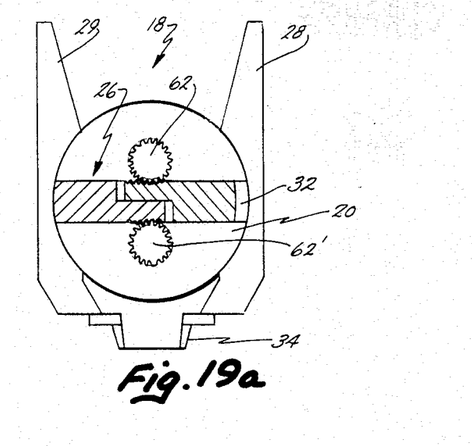
Figure 19B:
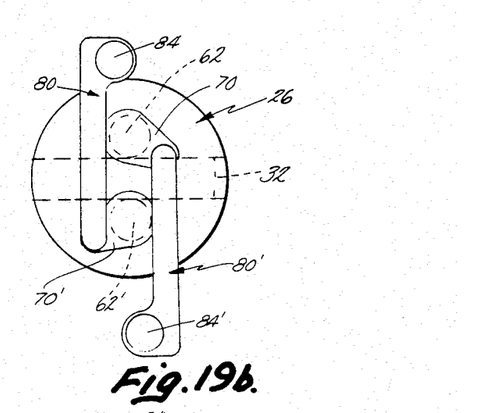
Figure 19C:
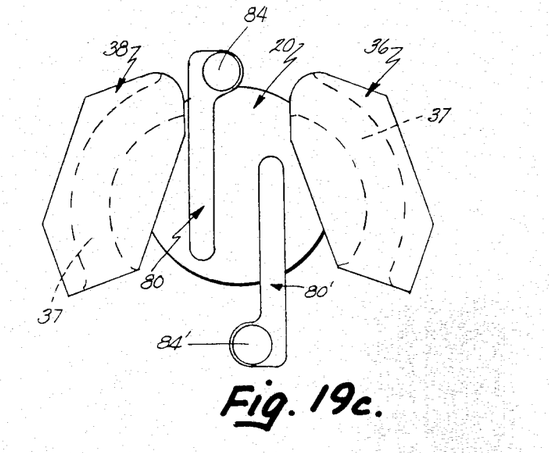

FIG. 19 illustrates the structure just described with the cylinder 20 having rotated clockwise approximately 45°, such that the piston or plunger unit 36 occupies a horizontal position (FIG. 19a). As shown, the drive pinions 62, 62', along with their carrying shaft 60, have also been moved bodily in a clockwise direction, in unison with the plunger 26, being carried with the cylinder. It will be observed that the plunger unit 26 has not shifted along its passage 24 during this rotation of cylinder 20, and neither have the two plunger components shifted relative to one another; thus, the volumetric chamber 32 is the same size as it was in FIG. 18a. Similarly, the relative positions of the cranks 70, 70' and of their associated slide bars 80, 80' (FIGS. 19b and 19c) have not changed from the positions occupied in FIGS. 18b and 18c, although the cylinder 20 has rotated to the extent bringing the longitudinal axes of the slide bars into vertical orientation, with the cam follower 84 at the 12 o'clock position, completely disengaged from cam 38, and with cam follower 84' in the 6 o'clock position, free of the cam track in cam 36.

Figure 20A:
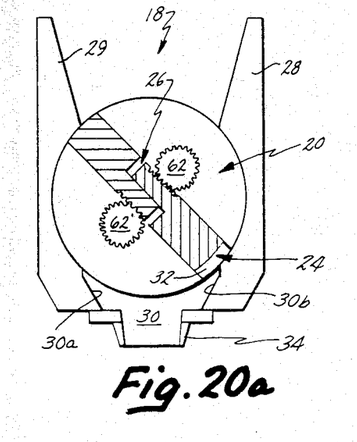
Figure 20B:
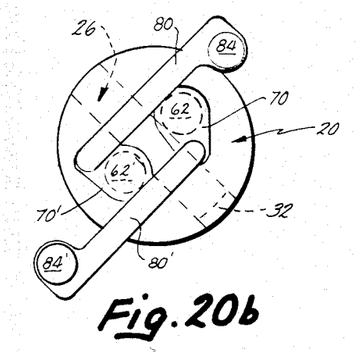
Figure 20C:
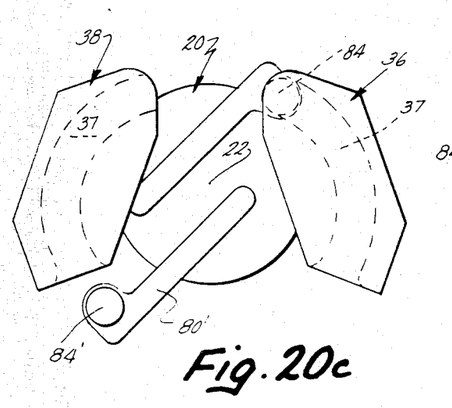

FIG. 20 illustrates the relative positioning of the above structures with the cylinder 20 having rotated another 45° in a clockwise direction from that shown in FIG. 19, and it will be observed that the positive-displacement plunger 26 has still not changed its position along the transverse passage 24 in cylinder 20, the measured volumetric chamber 32 still being the same as in the preceding two Figures. However, the volumetric chamber is now entering the discharge area 30 beneath the cylinder, the leading edge of passage 24 having cleared the edge of angular wall 30b, and having advanced approximately to the point where the first longitudinal scraper blade 152 is located in embodiments utilizing the scraper apparatus 150. At this point of relative cylinder rotation, the slide bars 80, 80' and crank throws 70, 70' have still not changed relative position, even though having been carried along further with cylinder 20, but it will be noted that (as shown in FIG. 20c) cam follower 84 is now entering cam track 37 of cam 36, and cam follower 84' is approaching entry of cam track 37 in cam 38.

Continued rotation of cylinder 20 thus carries both cam followers 84 and 84' through a traversal of their respective cam tracks which, as noted above, are shown for purposes of illustration in FIGS. 18-21, inclusive, in a position which is perceptibly non-concentric with respect to the axis of cylinder rotation 22. Accordingly, such further rotation of the cylinder 20 will ultimately bring cam follower 84 to the position shown for cam follower 84' in FIG. 18c, while cam follower 84' will be brought to the position shown for cam follower 84 in FIG. 18c.

The shift in cam follower position just noted imparts a corresponding lengthwise shifting of the associated slide bars 80, 80' and, since the opposite ends of the slide bars are linked to the crank throws 70, 70', the crank throws will therefore be rotated by this action. Rotation of the crank throws, in turn, rotates the pinion shafts 60, 60', thereby rotating the pinion gear sectors 62, 62' mounted on such shaft, which are engaged with the rack teeth 52. This brings about longitudinal shifting of both corresponding metering plunger portions, however, since the crank throws and pinion shafts are being rotated in opposite directions (both slide bars 80, 80' being shifted longitudinally toward the right, as may be seen by comparing FIGS. 20c, 21c, and 18c), the relative positions of the two plunger halves do not significantly change, even though the pinion gear rotation upon the rack gears moves the entire plunger 26 as a unitary structure in a shuttle-like manner within its passage 24 from the position shown in FIG. 20a to that shown in FIG. 18a, i.e., downward in passage 24. This brings the lowermost edge of the plunger into flush alignment with the outer periphery of cylinder 20 while simultaneously moving the uppermost edge of the plunger downward, thereby opening a volumetric chamber 32 at the top of the cylinder once again, i.e., within the discharge outlet area 18 of the supply means 12.

Figure 21A:
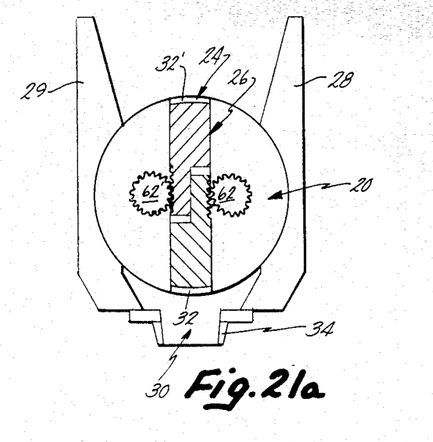
Figure 21B:
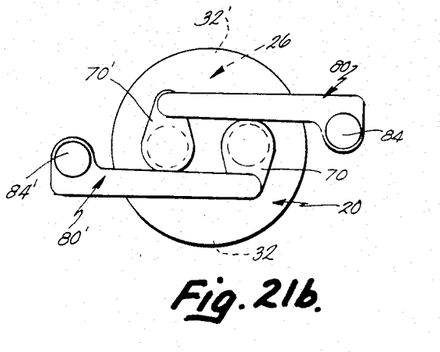
Figure 21C:
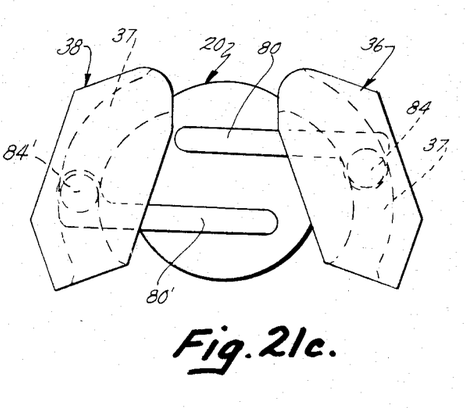

During cylinder rotation from the position shown in FIG. 20 to that shown in FIg. 18, as just described, the cylinder 20 and its associated components go through the position shown in FIG. 21, in which it will be observed that the metering plunger 26 is essentially centered in passage 24, the volumetric cavity 32 which in FIG. 20a was just entering the discharge area 30 having been reduced to approximately half its previous volume, and a corresponding half-volume chamber 32' now being present at the top of the cylinder, in alignment with the discharge outlet 18 of the supply means. Thus, it will be apparent that both parts of the positive-displacement plunger 26 move progressively downward as a unit during cylinder rotation from the position of FIG. 20a to that of FIG. 18a. This conjoint, unitary movement of the two piston halves is caused by simultaneous counter-rotation of the pinions 62, 62' as a result of the simultaneous-camming actuation on the slide bars 80 and 81 in the same longitudinal direction.

Accordingly, throughout the interval when the metering plunger moves through the arcuate discharge area 18, progressive downward movement of the piston 26 operates to open the volumetric metering chamber 32 at the top of the cylinder. As a result, chamber 32 receives a full volumetric charge of the media which is present in the discharge area of the supply means, the uppermost edge of the cylindrical recess in vertical support 28 serving to "doctor" the volumetric charge in the chamber by leveling off the media flush with the top of the cylinder. At the same time, the unitary downward movement of the plunger 26 serves to eject the metered volumetric quantity of media from the chamber 32 when it reaches the bottom of the cylinder, the ejected media entering the discharge area 30 which communicates with the discharge-shaping die orifices 34.

In the foregoing, it will be seen that during each complete revolution of cylinder 20, the positive-displacement plunger means 26 is moved in shuttle-like fashion from top to bottom on two occasions, each time receiving a charge of media at the top and ejecting a like charge at the bottom, each such charge being substantially identical volumetrically. Each such shuttle-like movement of the displacement plunger occurs as a result of the two cam followers 84, 84' having sequentially traversed the full length of each of the cam tracks 37 in the two complementary cams 36 and 38. As illustrated, the cam tracks 37 are preferably disposed along a smooth curve and, in the preferred embodiment, are in fact circular in shape and mirror images of each other. Accordingly, the resulting longitudinal translation of the slide bars 80, 80' occurs in a smooth and progressive manner, thus accounting for the progressive opening of the top volumetric chamber 32 during the entire sweep of the plunger through the arc defining the supply means discharge outlet 18, and conversely, the progressive downward ejecting movement of the plunger during the entire arc at the bottom of the cylinder defining the discharge area 30. It should be noted, however, that in accordance with the broader aspects hereof, the particular nature of this progressive volumetric chamber opening and charge ejecting movement may be given other and different characteristics, i.e., the volumetric chamber may be made to open more or less suddenly at the top, and at varying positions in the supply area 18, in order to accommodate or facilitate charging of the media into the chamber and/or ejection of the media at the bottom of the cylinder.

One aspect of the media-ejection operation occurring at the bottom of the cylinder which is involved in the preferred embodiment shown and described herein relates to the progressive ejection which occurs as a result of the steady and progressive downward movement of the plunger throughout the arc defining the discharge area 30. That is, this operation in effect tends to produce ejection in the form of a layer or strata of the media wiped across the arcuate top of the discharge area, at least where the media is of such characteristics as to require positive ejection, i.e., does not merely flow outward into the discharge area as soon as the volumetric chamber 32 comes into registry therewith. The scraper blade apparatus 150 noted previously further facilitates smooth, progressive ejection of such media, in effect by operating to ensure separation of the media from the cylinder at different points during its rotation through the discharge arc. In this manner, discharge uniformity is enhanced, including the uniform loading of the discharge area 30 and of the discharge-shaping orifices 34, thus enhancing and promoting the deposit of uniformly-shaped quantities from beneath the orifices 34.

It is important to note from the foregoing description of the operation and effect of the cams 36 and 38, operating through their respective cam followers, slide bars, crank throws, and pinion shafts, that pivotal adjustment of the relative angular positions of cams 36 and 38, i.e., toward or away from one another, will result in a change in the "throw" of the positive-displacement plunger, i.e., will produce corresponding changes in the relative angular position of the crank throws 70, 70', with corresponding rotation of the pinion gear shafts 60, 60'. This results in changes in the relative position of the two halves or component portions of the metering plunger 26. For example, referring to FIG. 21, it may be seen that if the cams 36 and 38 are pivoted so that the bottom extremities move further away from one another, slide bar 80 will in effect be moved further toward the right, whereas slide bar 80' will in effect be moved further toward the left, thereby rotating the crank throws 70, 70' in the same direction, i.e., clockwise. Referring to FIG. 19, it will be seen that clockwise rotation of pinion gears 62 and 62' will move the two plunger components further toward one another, thereby enlarging the metering chamber 32. Of course, oppositely-directed adjustments in the relative positions of cams 36 and 38 will result in decreases in the size of the metering chamber 32. These relative adjustments in cam position resulting in volumetric chamber changes are caused by rotation of the handwheel 121 and counter-threaded adjustment shaft 122, which may be done while the cylinder is in rotation.

Thus, it will be understood that the ultimate operational purposes of the adjustment apparatus 21 is to change the volume of the metered quantity being discharged each time the cylinder 20 rotates half a revolution. Since it may be assumed that the weight of the media corresponds more or less uniformly to its volume, volumetric adjustments of the discharged quantities may be analogized directly to weight adjustments. Although the handwheel 121 and associated mechanical components represent a preferred embodiment, and produce considerable operational control over the discharge rate, it should be noted that at least a minor degree of additional such control may be brought about by changes in the rotational speed of the feed rolls 14 and 16, since this in effect will change the extent to which the media is forced downwardly through the discharge outlet 18 and into the volumetric chamber 32. Since changes brought about in this manner are likely to be relatively minor compared to those brought about by actuation by the adjustment apparatus 21, feed roll speed adjustment may be considered to be a "fine" adjustment of the metered quantities, whereas handwheel rotation may be considered to be a "course" adjustment. Of course, in the broader aspects of this disclosure the feed rolls 14 and 16 should not be considered as being essential, since (depending upon the characteristics of a particular media) the feed rolls may or may not be necessary. At the same time, it may be very feasible in particular applications to use other means for supplying any desired media pressure against the top of the cylinder and the volumetric chamber defined therein.

It should be understood, in accordance with the foregoing, that the discharge area 30 extends longitudinally along and in flow communication with the full length of the ejection piston or plunger 26, and thus receives discharged media throughout the length of the area 30, tending to fill this entire volume. Beneath this common discharge-collection area are disposed a series of individual shaping orifices or die cups 34, each of which discharges its own separate, defined column of media. Of course, the discharge area 30 will, upon initial start-up, have to become substantially filled with media before the discharge orifices fill and begin to emit their respective individual columns of media. After this has occurred, however, each time the metering plunger 26 shifts downwardly a consistent and uniform quantity of media will be forced downward and out of the volumetric chamber 32, into the top of the discharge area 30, and this will cause a resulting uniform incremental volumetric flow, or movement, of the media outwardly through the end of each of the discharge orifices 34, each such incremental advance of discharged media being substantially identical in volume.

The foregoing is the typical operating condition involving medias in the nature of cookie dough, candy materials, and numerous other food products, which will usually exhibit a moderately high degree of cohesiveness, as well as a certain degree of adhesiveness, preventing the media from merely flowing by gravity directly out of the discharge orifices each time the volumetric chamber comes into flow communication therewith. Where cookie doughs and the like do constitute the media being metered, a wire-cut or other such oscillating knife apparatus 40, as referred to hereinabove, is desirable as part of the overall apparatus, for cycling across the bottom of the discharge orifices, incrementally cutting the progressively-emerging media columns into discrete wafer-like shapes, each of which can be expected to be substantially identical in volume and, by analogy, also in weight. Of course, other media may require other such separation or discharge techniques, but the underlying principle of repetitive ejection or discharge by positive-displacement volumetric metering plunger means will remain the same.

It it is to be understood that the above is merely a description of certain preferred embodiments of the invention, and that various changes and alterations can be made without departing from the underlying concepts and broader aspects of the invention as set forth in the appended claims, which are to be interpreted in accordance with established principles of patent law including the doctrine of equivalents.

The embodiments of the invention in which an exclusive property or privilege is claimed are defined as follows:

1. For use in a repetitive, cycling, depositor apparatus of the type having at least one piston mounted for reciprocal movement within a piston passage and defining therewith a chamber whose volume determines and meters a discrete quantity of flowable material, a piston and cylinder assembly comprising: a rotatable member and means mounting such member for rotation about an axis, said member generating a cylinder of revolution when rotated about said axis; said rotatable member having at least one piston passage extending transversely of said member and opening out of different side portions thereof, said piston passage being positioned generally diametrically of said cylinder of revolution and orthogonal of its said axis of rotation; a shuttle-like slide piston disposed for alternating back-and-forth movements within each of said piston passages; said shuttle-like pistons and transverse passages defining a metering chamber at the end of each piston, such chamber being located to receive a charge of flowable material at one extremity of piston movement and to eject such charge of material at the other extremity of shuttle-like piston movement, said shuttle-like piston comprising at least two separate but mutually coupled piston components, and including means for rigidly linking said piston components together for unitary movement during their alternating back-and-forth shuttle-like piston movements; and means for adjusting the effective stroke length of at least certain of said two-component pistons by adjustably changing the relative position of one such piston component with respect to the other while within their respective piston passages and while rigidly coupled together to thereby change the volume of the metering chamber defined by such pistons and passages, said means including gear teeth on each of said piston components in the form of a rack and gear means engaging said rack teeth to move the associated piston component relative to the other piston component by geared movement of its rack teeth.

2. The piston and cylinder assembly as recited in claim 1, wherein said means for adjustably changing the relative position of said two piston components comprises first adjustment means carried on said rotatable member and rotatable therewith, and second adjustment means independently supported in relatively fixed position, and including apparatus coupling said first and second adjustment means to one another such that actuation of the second such adjustment means results in motion to the first thereof effecting adjustment of said piston components with respect to one another even during rotation of said rotatable member.

3. The piston and cylinder assembly as recited in claim 1, wherein said racks and said gear means engaging the racks further comprise means for imparting said shuttle-like movement to said pistons.

4. The piston and cylinder assembly as recited in claim 3, wherein said gear means comprise a rotatably-mounted gear member having gear teeth engaging said rack teeth, and means for rotatably moving such gear member to thereby move said rack through its gear teeth and thereby move the piston component associated with that rack.

5. The piston and cylinder assembly as recited in claim 4, wherein said means for rotatably moving said gear member comprises a cam and follower mechanism.

6. The piston and cylinder assembly as recited in claim 5, wherein said gear member is carried with said rotatable member which generates a cylinder of revolution and moves in unison rotationally therewith, and wherein said cam and follower mechanism comprise a rotationally-actuated apparatus having at least a first portion which is generally fixed and non-rotational with respect to said rotatable member, and also having a second portion which is carried rotationally with said rotatable member and which imparts rotational movement to said gear member during at least part of the rotary movement which the latter undergoes in unison with said rotatable member.

7. The piston and cylinder assembly as recited in claim 6, wherein said cam and follower mechanism comprises at least one cam having an arcuate cam surface and being generally fixedly mounted, and independent of said rotatable member; and a cam follower apparatus engaging said cam surface and following the contour of the same, said follower apparatus being coupled to and carried with said rotatable member; said cam follower apparatus further being coupled to said gear member to rotatably move the same in response to composite motion of the cam follower imparted by rotation with the said rotary member and also imparted by following the contour of said cam surface.

8. The piston and cylinder assembly as recited in claim 7, wherein said cam having said arcuate cam surface is mounted for adjustable movement generally toward and away from the said axis of rotation of said rotary member to thereby change the position of the cam surface with respect to said axis and in turn change the respective path of movement of the cam follower, thereby changing the motion imparted to said gear member during rotation of said rotary member and changing the operative length of the piston associated with said gear member through the piston rack engaged by that gear member.

9. The piston and cylinder assembly as recited in claim 1, wherein said piston components comprise laterally-elongated members whose width in the direction of lateral elongation is greater than their thickness in a direction orthogonal to their said width; said piston passage which receives said piston components comprising a laterally-elongated slot extending through said rotatable member and across the cylinder of revolution generated thereby.

* * * * *